United States Patent [19]
Chang et al.

[11] 3,929,190
[45] Dec. 30, 1975

[54] SECONDARY OIL RECOVERY BY WATERFLOODING WITH EXTRACTED PETROLEUM ACIDS

[75] Inventors: Harry L. Chang; Evin L. Cook; Ralph F. Burdyn, all of Dallas, Tex.

[73] Assignee: Mobil Oil Corporation, New York, N.Y.

[22] Filed: Nov. 5, 1974

[21] Appl. No.: 521,009

[52] U.S. Cl. .................................. 166/274; 166/273
[51] Int. Cl.² .......................................... E21B 43/22
[58] Field of Search ............ 166/270, 272, 273–275, 166/305 R, 307; 252/8.55 D

[56] References Cited
UNITED STATES PATENTS

| | | | |
|---|---|---|---|
| 2,267,548 | 12/1941 | Berl | 166/275 |
| 3,111,984 | 11/1963 | Reisberg | 166/270 |
| 3,195,629 | 7/1965 | Leach | 166/273 |
| 3,298,436 | 1/1967 | McCardell | 166/270 |
| 3,302,713 | 2/1967 | Ahearn et al. | 166/275 X |
| 3,330,347 | 7/1967 | Brown et al. | 166/270 |
| 3,344,858 | 10/1967 | Gilchrist et al. | 166/270 |
| 3,358,757 | 12/1967 | Holmes | 166/270 |
| 3,372,749 | 3/1968 | Williams | 166/274 |
| 3,387,655 | 6/1968 | Hurd | 166/273 X |
| R23,360 | 4/1951 | Berl | 252/8.55 D |

OTHER PUBLICATIONS

Foster, W. R., "A Low–Tension Waterflooding Process," JPT, Vol. 25, Feb. 1973, pp. 205–210.
The Oil and Gas Journal, "Plant Recovers Traces of Naphthenic Acid," Apr. 29, 1974, p. 59.

*Primary Examiner*—Stephen J. Novosad
*Attorney, Agent, or Firm*—C. A. Huggett; William D. Jackson

[57] ABSTRACT

A process for recovery of oil from a subterranean oil reservoir penetrated by spaced injection and production wells which involves the injection of an aqueous solution of neutralized organic acids extracted from a petroleum oil. The extract may be obtained at the oil field site or in conjunction with a refining operation. Subsequent to the injection of the aqueous extract of neutralized acids into the reservoir a mobility control slug may be injected in order to increase the sweep efficiency of the waterflood. In addition, a monovalent salt and an alkaline agent may be added to the aqueous extract solution prior to injection thereof.

10 Claims, 3 Drawing Figures

SECONDARY OIL RECOVERY BY WATERFLOODING WITH EXTRACTED PETROLEUM ACIDS

BACKGROUND OF THE INVENTION

This invention relates to the recovery of oil from subterranean oil reservoirs and more particularly to improved waterflooding operations involving the injection into such reservoirs of neutralized organic acids extracted from petroleum oil by an aqueous alkaline medium.

In the recovery of oil from oil-bearing reservoirs, it is usually possible to recover only minor portions of the original oil in place by the so-called primary recovery methods which utilize only the natural forces present in the reservoir. Thus a variety of supplemental recovery techniques have been employed in order to increase the recovery of oil from subterranean reservoirs. The most widely used supplemental recovery technique is waterflooding which involves the injection of water into an oil-bearing reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflooding. Thus it has been proposed to add surfactants to the injected water in order to lower the oil-water interfacial tension and/or to alter the wettability characteristics of the reservoir rock. Also, it has been proposed to add thickening agents to all or part of the injected water in order to increase the viscosity thereof, thus decreasing the mobility ratio between the injected water and oil and improving the sweep efficiency of the waterflood.

Processes which involve the injection of aqueous surfactant solutions in order to reduce the oil-water interfacial tension are commonly referred to as low tension waterflooding techniques. To date one of the more promising low tension waterflooding techniques involves the injection of aqueous solutions of petroleum sulfonates within a designated equivalent weight range and under controlled conditions of salinity. For example, in a paper by W. R. Foster entitled "A Low Tension Waterflooding Process," JOURNAL OF PETROLEUM TECHNOLOGY, Vol. 25, Feb. 1973, pp. 205–210, there is disclosed a procedure which involves the sequential injection of a protective slug, a surfactant slug, and a mobility control slug. The protective slug is an aqueous solution of sodium chloride which is injected in order to displace the reservoir water ahead of the subsequently injected surfactant slug. This slug is substantially free of divalent ions which would tend to precipitate the subsequently injected surfactant.

The surfactant slug comprises an aqueous solution of petroleum sulfonates and contains sodium chloride in a concentration, typically about 1.0 to 2.0 weight percent, which will promote the desired low interfacial tension between the injected water and the reservoir oil. The subsequently injected thickened water slug contains a viscosifier such as a water-soluble biopolymer in a graded concentration in order to provide an initial viscosity greater than the viscosity of the reservoir oil and a terminal viscosity near that of water. Thereafter a driving fluid such as produced field brine is injected in order to carry the process to conclusion.

While recent emphasis has been placed upon the use of petroleum sulfonates in low tension waterflooding, numerous other surfactants have been proposed for use. For example, U.S. Pat. No. 2,267,548 to Berl suggests the use of long chained organic acids such as oleic, palmitic, and stearic acids and the corresponding soaps. This patent also discloses employing the sodium salts of "so-called tar acids" and states that water soluble tar acids may be made in accordance with U.S. Pat. No. 1,812,316 or may be formed by "adding to water-soluble tar acids of the acid wash in petroleum refining, the alkaline wash liquids from the purification of crude oil fractions." Reference is also made to the use of "water solutions of free tar acids or/and their acid salts." The disclosures in this patent relating to the above-mentioned soaps and tar acids and their salts were later deleted by U.S. Pat. No. Re. 23,360.

Another waterflooding procedure, in which surfactants are formed in situ, involves alkaline waterflooding. In this process an aqueous solution of an alkali metal or ammonium hydroxide or carbonate is injected in order to neutralize organic acids in the reservoir oil to produce the corresponding alkali metal or ammonium salts. Alkaline waterflooding has been proposed in regard to various recovery mechanisms, i.e., to lower the interfacial tension between the reservoir oil and the injected water, to alter or even reverse the wettability of the reservoir, e.g., from oil-wet to water-wet, or for the purpose of mobility control by the formation of a relatively viscous oil and water emulsion.

An improved alkaline waterflooding process is described in U.S. patent application Ser. No. 508,965, filed Sept. 25, 1974, by Ralph F. Burdyn, Harry L. Chang, and William R. Foster, and entitled "ALKALINE WATERFLOODING PROCESS." In this process an aqueous alkaline solution is employed in which the alkalinity and monovalent salt salinity of the solution are controlled within defined ranges in order to result in low oil-water interfacial tensions which enhance the microscopic displacement of oil from the interstices of the reservoir rock. A thickened water slug may be used for the purpose of mobility control in the alkaline waterflood. As recognized in the Burdyn et al. application, the results achieved by alkaline waterflooding and the roles played by the various recovery mechanisms involved depend to some extent upon the molecular weight distribution of the organic acids within the reservoir oil.

An additional factor which is relevant to the efficacy of an alkaline waterflood is the total acid content of the reservoir oil. This is commonly measured by the "acid number" which is defined as the milligrams of potassium hydroxide required to neutralize the acids in one gram of crude oil in a nonaqueous type titration. Various procedures have been proposed for the alkaline waterflooding of those reservoirs in which the crude oil is considered to have an inadequate acid content as indicated by the acid number. One technique disclosed in U.S. Pat. No. 3,195,629 to Leach involves the injection of air, peroxides, or other oxidizing agents into the reservoir in order to oxidize the oil in situ to form additional organic acids. Additionally, a preoxidized oil bank may be injected or high molecular weight acids may be added to the injected oil bank. In any case, an aqueous alkaline solution is injected in order to form the sodium salts of the organic acids. Yet a further technique disclosed in U.S. Pat. No. 3,344,858 to Gilchrist et al. involves an alkaline waterflood process in which an aqueous alkaline slug is injected first and then followed with a hydrocarbon slug containing organic acids. These acids are neutralized in situ to form the corresponding surface active salts.

SUMMARY OF THE INVENTION

In accordance with the present invention there is provided a new and improved waterflooding process in which the interfacial tension between the reservoir oil and injected water is reduced by the injection of organic acids extracted from a petroleum oil by an aqueous alkaline medium. In carrying out the invention, a petroleum oil, which may be a crude oil or a fraction thereof, is contacted with an aqueous alkaline solution in order to extract neutralized organic acids from the oil into the aqueous medium. The resulting aqueous solution of organic acids is separated from the oil and then injected into the reservoir. Thereafter an aqueous flooding medium is injected in order to displace oil to a production system penetrating the reservoir and from which the oil is recovered. In a preferred embodiment of the invention the petroleum oil is a crude oil fraction which has an API gravity within the range of 10° to 25° API.

The make up water employed for the alkaline solution should be relatively fresh since a high salt content is deleterious to the extraction process. Thus, in a further embodiment of the invention a monovalent salt such as sodium chloride is added to the aqueous solution of neutralized acids produced by the extraction process in order to promote the desired low interfacial tension between the injected aqueous solution and the reservoir oil. In yet a further embodiment of the invention an alkaline agent is added to the aqueous solution of neutralized organic acids prior to injection thereof in order to increase the solution pH and enhance the neutralization of organic acids which are indigenous to the reservoir oil.

In a further aspect of the invention there is provided an oil recovery process in which the extraction of organic acids is accomplished at the oil field in which the reservoir undergoing the recovery process is located. In this procedure, water from a suitable source in the field is mixed with an alkaline agent in order to form an aqueous alkaline solution. This solution is then passed to an extraction zone to contact a petroleum oil produced in the field in order to extract neutralized organic acids from the oil. One effluent from the extraction zone comprises an oil stream while a second effluent comprises the aqueous solution of neutralized acids in which some oil is present as a separate phase. This second effluent is passed to a separation zone in which at least a portion of the oil is separated therefrom and returned to the first effluent stream. The aqueous solution of neutralized acids is withdrawn from the separation zone and injected into the oil reservoir in order to effect the displacement of oil therefrom.

DESCRIPTION OF SPECIFIC EMBODIMENTS

The use of alkaline agents in the treatment of petroleum oils is well known in the petroleum refining art. Typically, alkali metal hydroxides and carbonates, principally sodium hydroxide, have been employed in order to remove or neutralize organic acids indigenous to the oil or inorganic acids present in the oil due to acid treatment. Such agents have also been used to improve the color or odor of the oil or to remove impurities such as sulfur and hydrogen sulfide. Alkaline refining has been employed with respect to virtually all fractions encountered in refining operations including the crude oil feedstock and ranging from the light fractions such as gasoline ranging through the heavier fractions such as lubricating oils.

One example of an alkaline extraction process is found in an article entitled "Plant Recovers Traces of Naphthenic Acid," appearing in THE OIL AND GAS JOURNAL, Apr. 29, 1974, at page 59. As described in this article, the kerosine and diesel fractions are extracted with a neutralizing solution of 15° Baume caustic soda. The resulting aqueous solution of sodium naphthenates is then treated with sulfuric acid in order to produce naphthenic acids.

In the present invention the petroleum oil feedstock employed in the alkaline extraction process may be a distillate fraction, such as may occur during conventional petroleum refining operations, or it may be an unrefined crude oil. The latter situation usually will prevail where the extraction process is carried out onsite, in which case the feedstock may be lease crude which is diverted from delivery to the pipeline.

Figure 1:
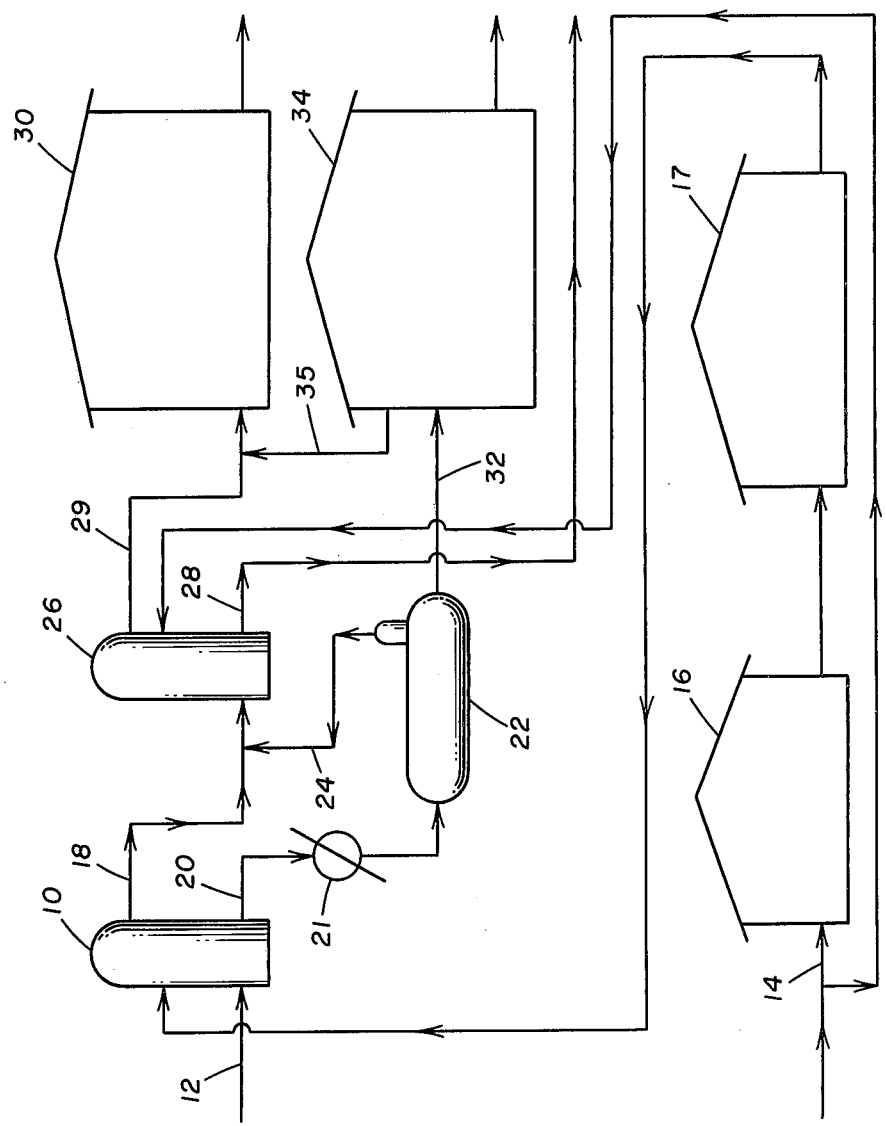
FIG. 1 is a schematic flow diagram illustrating an onsite extraction plant which may be employed in carrying out the invention.

Turning now to FIG. 1, there is illustrated a flow diagram of an alkaline extraction plant which may be used for onsite extraction in accordance with the present invention. In carrying out this embodiment of the invention, crude oil produced in the oil field is passed to an acid extraction zone 10 by means of inlet line 12. In addition, water from a source of water in the field such as oil-water separators, water wells, or ponds is passed by line 14 to a mixing tank 16 where it is mixed with an alkaline agent to produce an aqueous alkaline solution. Preferably the alkaline agent will be sodium hydroxide added to the water in an amount to provide a 0.05 to 1.0 normal solution. However, other alkali metal and ammonium hydroxides or carbonates may be employed. The water employed in making the alkaline solution should be relatively fresh, normally containing less than 500 parts per million (ppm) dissolved salts, since a high salt content will retard the extraction process.

The alkaline solution is passed from the mixing zone 16 into a storage facility 17 and from there taken as needed for introduction into the extraction zone 10. The ratio of the volumetric flow rate of alkaline solution to zone 10 to that of the feedstock oil preferably is within the range of 0.1 to 0.8. As shown in FIG. 1, extraction preferably is accomplished by a countercurrent process although it is to be recognized that a concurrent process such as a type illustrated in the aforementioned OIL AND GAS JOURNAL article or even batch-type extraction processes may be employed.

The output from the extraction zone is composed of two effluent streams indicated by reference characters 18 and 20. The first effluent stream 18 comprises the oil from which organic acids have been extracted and the second comprises a mixture of the aqueous solution of extracted acids and also some oil. A portion of the oil present in the second effluent is in the form of a fine oil-in-water emulsion containing about 2 to 20 percent oil in the dispersed phase in droplet sizes ranging from about 0.1 to 10.0 microns. Additional oil normally will be present in a separate phase. This second effluent is passed to a separation zone 22 in order to separate at least a portion of the oil therein and return it to the oil effluent stream. Preferably the oil phase is separated from the extract solution and returned to effluent stream 18 by means of line 24. It normally will not be desired to separate out the fine oil-in-water emulsion from the aqueous solution of neutralized acids since this may be retained therein for injection in the oil recovery process. Preferably the second effluent 20 first is passed through a heater 21 in order to heat the effluent mixture to a temperature within the range of 50° to 80° C. to facilitate separation of the oil phase from the aqueous phase containing the neutralized acids and the fine oil-in-water emulsion. At this temperature range this selective separation may be accomplished by means of a heated and insulated coalescer with sufficient retention time to permit separation of the major part of the oil phase.

The oil effluent 18 usually contains some residual alkaline agent which should be removed prior to transferring the oil to the pipeline. This is accomplished in the preferred embodiment of the invention by circulating fresh water from the field water source to a separation zone 26. Zone 26 comprises a water wash contactor in which fresh water (having a dissolved solids content of less than 500 ppm) is circulated in countercurrent flow with the oil effluent in order to remove the residual alkaline agent. The water effluent 28 from zone 26 is passed to a suitable waste water disposal zone and the oil effluent 29 is passed to an oil storage facility 30 from which it may then be transferred to the pipeline.

The aqueous phase from separation zone 22 is passed by means of line 32 to a storage tank 34 from which the injection solution can be withdrawn as needed. Tank 34 is equipped with an oil drain line 35 through which any oil which remains in the extract as a separate phase may be withdrawn and passed to the oil storage tank 30.

The aqueous extract solution in tank 34 may contain neutralized organic acids in a concentration as low as 0.5 percent by weight to as high as 35 percent by weight. Normally, however, the neutralized acid concentration will fall within the range of about 2 to 30 weight percent. The organic acid concentration in the injected water normally should be within the range of 0.5 to 3 percent by weight. Thus, in some instances it may be necessary to actually increase the neutralized organic acid content prior to injection by concentrating the aqueous solution such as through evaporation. However, in most instances it will be necessary to dilute the solution in storage zone 34 with water prior to injection in order to arrive at the desired concentration of the neuralized organic acids. Typically the concentration of the dispersed oil contained in the aqueous solution as injected will be in the range of 2 to 10 percent by volume.

At the time of diluting the aqueous acid solution to the desired acid concentration, the injected solution can also be adjusted to the desired salinity level. As noted hereinafter, it normally will be preferred to provide a monovalent salt salinity in the aqueous acid solution within the range of 0.5 to 2.0 weight percent. In addition, if it is desired to add an alkaline agent to the solution as described hereinafter, this can also be accomplished during the dilution step.

With the onsite extraction facility illustrated in FIG. 1, the feedstock normally will not be subject to prior refining other than the preliminary field processing steps usually carried out to separate gas, water and sediments from the crude oil, as explained, for example, in Chapter XI, Uren, OIL FIELD EXPLOITATION, Third Edition, McGraw-Hill Book Company, Inc., New York, Toronto, London, 1953. While onsite extraction offers the advantage of relatively simple logistics, the average molecular weight and molecular weight distribution of neutralized organic acids in the resulting extract will be largely uncontrolled since the extraction process itself is not selective with respect to molecular weight. In accordance with a further embodiment of the invention, extraction of organic acids may be carried out in conjunction with refining operations, and in this case a refined oil fraction may be selected to provide neutralized organic acids within a desired molecular weight range.

As explained in the aforementioned application, Ser. No. 508,965, by Burdyn et al., it is believed that impact of the recovery mechanisms of interfacial tension reduction, emulsification, and wettability alteration on oil displacement depend partly upon the molecular weight distribution of the organic acids which are neutralized to form surface active agents. These acids are classified in the Burdyn et al. application as low molecular weight acids (molecular weights within the range of about 300 to 500), intermediate molecular weight acids (molecular weights within the range of 500 to 1000), and high molecular weight acids (molecular weights of more than 1000). As further explained in Burdyn et al., it is believed that the interfacial tension reduction mechanism is particularly enhanced by the lower molecular weight acids, with those of higher molecular weight contributing progressively less to this mechanism and more to emulsification and wettability alteration.

When carrying out the present invention in conjunction with a petroleum refining operation, it is preferred to select as the feedstock a petroleum fraction in which the organic acids are predominantly within the molecular weight range of 300 to 1000 thus emphasizing the interfacial tension reduction mechanism. To obtain an extract of acids within this molecular weight range it is preferred to employ as the feedstock a crude oil fraction exhibiting an API gravity of 10° to 25°, such as the atmospheric bottoms or vacuum heavy gas oil fractions from oil refineries utilizing as charge stock a naphthenic crude of high acid number, e.g., on the order of 0.5 or above.

Except for the use of a distillate fraction as a feestock, the alkaline extraction procedure used in conjunction with petroleum refining operation may be similar to that described above with respect to the onsite procedure. However, it is to be recognized that other procedures may be used. For example, the extraction process described in the aforementioned OIL AND GAS JOURNAL article may be employed in carrying out the present invention, except that the sulfuric acid acidification step described in that article should be eliminated.

Regardless of the procedure employed in obtaining the aqueous solution of neutralized organic acids, it is preferred to add a monovalent salt to the solution in order to enhance the interfacial tension reduction mechanism in the oil displacement process. While the desired salinity for optimum oil displacement is specific with regard to particular reservoir oil-neutralized acid systems, the preferred monovalent salt salinity normally will fall within the range of 0.5 to 2.0 weight percent, as described in greater detail in the aforementioned Burdyn et al. application. The salinity of the aqueous solution of neutralized organic acids which is injected into the formation usually will be controlled by the addition of sodium chloride since this salt is inexpensive and normally readily available. However, salinity control can be accomplished by means of other monovalent salts, particularly the alkali metal halides such as potassium chloride.

In a further aspect of the invention an alkaline agent may be added to the injection medium in order to effect the neutralization of organic acids in situ to the corresponding surface active salts. While the alkalinity of the injected medium also is specific with regard to the particular reservoir oil involved, the preferred pH normally will be within the range of 11.5 to 13, as described in the aforementioned Burdyn et al. application. The alkaline agent added to the aqueous solution of neutralized organic acids preferably is sodium hydroxide although other alkali metal or ammonium hydroxides or carbonates may be employed.

In carrying out the invention it usually will be desirable to inject a thickening agent for mobility control purposes. The thickening agent may be added to the initially injected aqueous solution of neutralized acids or may be injected in a separate slug. Usually it will be preferred to inject the thickening agent in a slug subsequent to the injection of an initial portion or all of the aqueous solution of neutralized acids and to adjust the alkalinity and salinity of the mobility control slug as taught in the aforementioned Burdyn et al. application to a pH within the range of 11.5 to 13.0 and a monovalent salt salinity within the range of 0.5 to 2.0 weight percent. The viscosity of the mobility control slug will be greater than the viscosity of the aqueous solution of neutralized organic acids and normally will be within the range of one to four times the viscosity of the reservoir oil.

Various thickening agents which may be employed to increase the viscosity or apparent viscosity of the mobility control slug are well known to those skilled in the art and include such naturally occurring materials as guar gum or Karaya gum, or such synthetic materials as the polysaccharide B-1459 available from the Kelco Chemical Company under the trade name "Kelzan," poly(glucosylglucan)s, such as disclosed in U.S. Pat. No. 3,372,749 to Williams, and available from the Pillsbury Company under the trade name "Polytran", or the partially hydrolyzed polyacrylamides available from the Dow Chemical Company under the trade name of "Pusher Chemicals." An ionic polysaccharide such as "Kelzan" usually will be preferred as the thickening agent for reasons set forth more fully in the aforementioned Burdyn et al. application.

To demonstrate the results obtained by the injection of an aqueous extract of organic acids, comparative oil displacement experiments were carried out with thickened water, a thickened alkaline solution, and a thickened extract of neutralized organic acids. The linear displacement experiments were performed in 3-foot long flow tubes having an inside diameter of ¼ inch and packed with unconsolidated Berea sand. In each tube run the sand-packed tube was saturated with saline water, with the amount of water necessary to achieve the saturation being measured to determine the total pore volume within the tube. The tube was then flooded with oil until the effluent from the tube contained no water. The total amount of water displaced from the tube during this operation was measured in order to determine the initial oil saturation. The oil used to simulate the reservoir oil in these tests was a crude oil exhibiting an acid number of 0.317.

For one set of tests, an aqueous extract of the organic acids was prepared by mixing 9 parts of a 0.1 N sodium hydroxide solution with 91 parts of the same crude oil as was used to simulate the reservoir crude and then shaking this mixture for several minutes. The mixture was then allowed to settle overnight to separate into separate oil and aqueous phases. The aqueous phase containing neutralized organic acids and also a fine oil-in-water emulsion, as described previously, was then withdrawn from the bottom of the sample container. Sodium chloride, sodium hydroxide, and Kelzan were then added and the solution was diluted to arrive at a final solution which contained 1.0 percent by weight sodium chloride, 750 parts per million Kelzan, 0.064 N sodium hydroxide (pH 12.8), about 1 to 1 ½ percent neutralized organic acids, and approximately 5 percent by volume of oil in a fine emulsion. This solution was then injected into the tube and the amount of oil recovered was measured as a function of the total fluid produced from the tube.

Similar experiments were run employing an aqueous alkaline solution optimally adjusted with respect to salinity and alkalinity but without an aqueous extract as in the previously described tests. The displacement medium in this test contained 1.0 weight percent sodium chloride, 0.01 N sodium hydroxide (pH 12.0), and 750 parts per million Kelzan. In a third set of experiments the aqueous displacement medium contained 1.0 weight percent sodium chloride and 750 parts per million Kelzan, but without an alkaline agent or aqueous extract.

Figure 2:
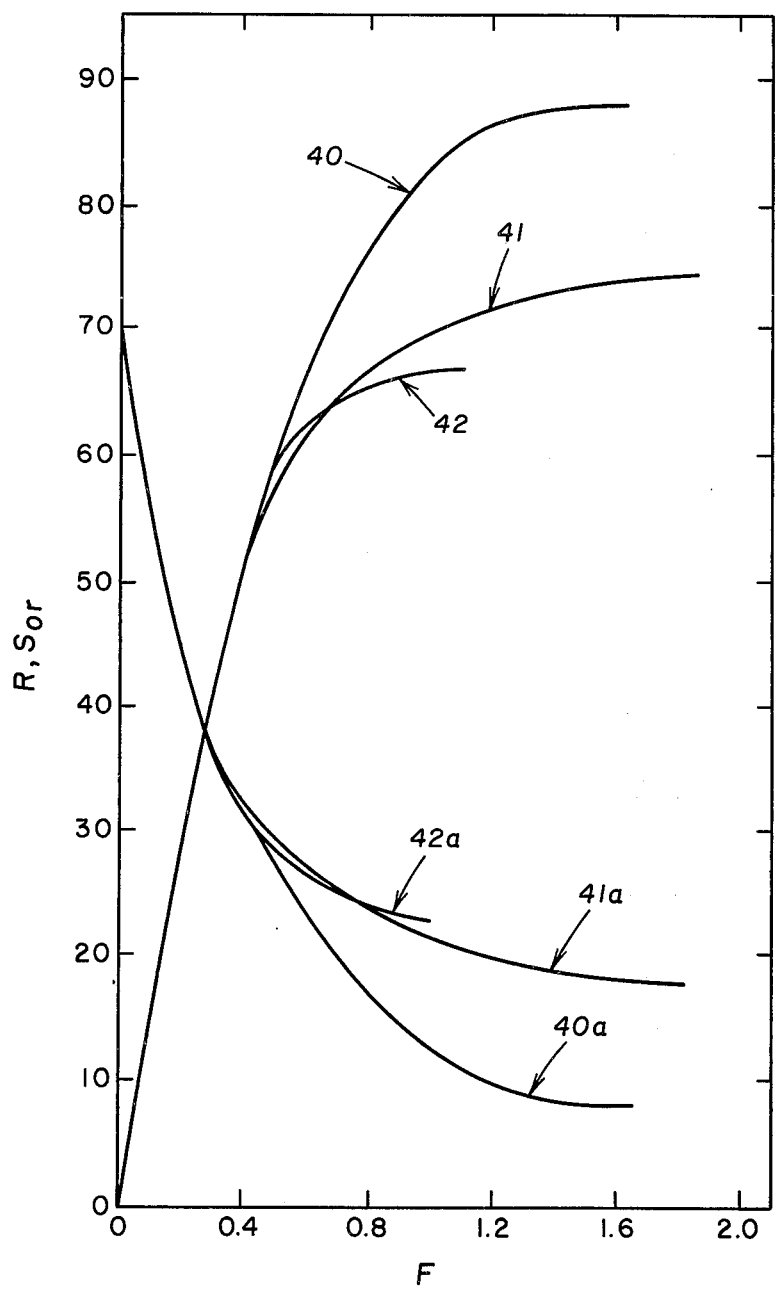
FIG. 2 is a graph illustrating the oil recovery achieved with an aqueous extract of organic acids compared with oil recoveries achieved by other displacing mediums.

The results of the above-identified experiments are illustrated in FIG. 2 in which percent residual oil saturation, $S_{or}$, and percent oil recovery, R, are plotted on the ordinate and the total fluid produced, F, in pore volumes is plotted on the abscissa. Curve 40 of FIG. 2 illustrates the percent oil recovery achieved in the first set of experiments; curve 41, the percent oil recovery obtained in the second set of experiments; and curve 42, the percent oil recovery achieved in the third set of experiments. Curves 40a, 41a, and 42a indicate the percent residual oil saturation resulting from the first, second, and third sets of experiments, respectively.

From examination of FIG. 2, it can be seen that the maximum pecent oil recovery achieved when using an aqueous extract of neutralized organic acids was approximately 88 percent compared with 74 percent for straight alkaline flooding and 67 percent for flooding without either an alkaline agent or acid extract.

As has been recognized in the prior art, divalent ions such as calcium and magnesium have a deleterious effect on alkaline waterflooding since such ions tend to precipitate the neutralized acids formed in situ. This same situation obtains for the neutralized acids in the extract solution employed in the present invention. Accordingly, where the water within the reservoir contains divalent metal ions in an amount of more than about 50 ppm it usually will be desirable to precede the neutralized acid extract solution with a protective slug in order to displace the formation brine and provide a "buffer" between the formation brine and the extract solution. Similar considerations prevail where the formation brine contains a relatively high concentration of monovalent salts such as sodium chloride. For example, if the formation brine exhibits a monovalent salt salinity significantly in excess of 2.0 percent, it usually will be preferred to inject a pretreatment slug regardless of the concentration of divalent ions present in the reservoir water. The pretreatment slug injected normally will contain sodium chloride in the range of 0.5 to 2.0 weight percent, and should of course be substantially free of divalent metal ions. As a practical matter, water containing divalent metal ions in a concentration no greater than 50 ppm may be used in forming the pretreatment slug and also the acid extract solution.

Figure 3:
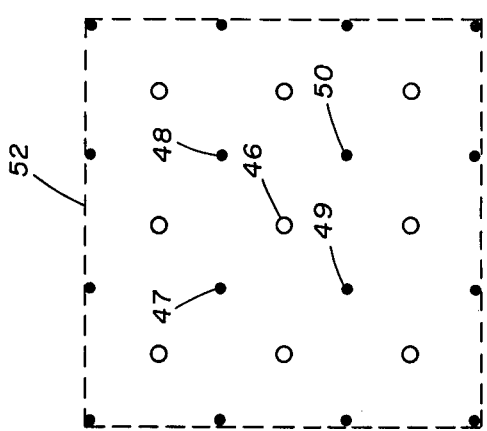
FIG. 3 is an illustration exhibiting one form of well pattern which may be employed in carrying out the present invention.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in FIG. 3. In this Figure, the legend o is used to indicate a production well and the legend ● is used to indicate an injection well. As shown in FIG. 3, this integrated pattern comprises a plurality of five-spot patterns each of which comprises a central production well, as indicated by reference character 46, and four peripheral injection wells, as indicated by reference numerals 47, 48, 49, and 50. By the term "pore volume" is meant the pore volume of the formation underlying the well pattern defined by the wells comprising the injection and production systems. Thus, the term "pore volume" as used with reference to the pattern shown in FIG. 3 is the pore volume of that portion of the formation underlying the area enclosed by broken line 52. Of course, other well arrangements may be used in carrying out the present invention, examples of which are set forth in the previously mentioned Burdyn et al. application.

With respect to quantities of the displacing fluids employed in the present invention, the aqueous solution of neutralized organic acids preferably is injected in an amount within the range of 0.1 to 0.5 pore volume. This slug may, and in most cases will, be preceded by a protective slug in order to provide a buffer between the aqueous extract solution and the reservoir brine. The protective slug, if employed, normally will be injected in an amount of up to 0.2 pore volume.

The relatively viscous mobility control slug is injected in an amount within the range of 0.1 to 0.5 pore volume. The mobility control slug may be injected subsequent to neutralized acid slug or it may be injected after an initial portion of the neutralized acid slug has been injected so that the two slugs partially overlap. The viscosity of the mobility control slug preferably is graded from a maximum viscosity of at least the viscosity of the reservoir oil to the viscosity of water. This is accomplished by progressively decreasing the concentration of polymeric thickening agent from its maximum value, normally a concentration within the range of 250 to 2500 ppm in the case of Kelzan, down to a concentration of zero. The thickening agent concentration may be decreased linearly or nonlinearly by increments. As a modification of the process the initiation slug containing the neutralized acids and the mobility control slug may be combined as a single slug in an amount within the range of 0.2 to 0.7 pore volume.

Subsequent to the injection of the mobility control slug, a driving fluid is injected in order to displace the previously injected fluids through the formation. The driving fluid typically may be any water which is locally available and is not incompatible with the formation. The driving fluid is injected in such amount, normally within the range of 0.5 to 1.0 pore volume, as is necessary to carry the displacement process to completion.

We claim:
1. In the recovery of oil from a subterranean oil reservoir penetrated by spaced injection and production systems, the method comprising:
   a. contacting a petroleum oil with an aqueous alkaline solution to extract neutralized organic acids from said oil in said aqueous medium,
   b. separating the resulting aqueous solution of neutralized organic acids from said oil,
   c. injecting said aqueous solution of neutralized organic acids into said reservoir via said injection system,
   d. thereafter introducing into said reservoir via said injection system an aqueous flooding medium to displace oil to said production system, and
   e. recovering oil from said production system.
2. The method of claim 1 wherein said petroleum oil is a crude oil fraction exhibiting an API gravity within the range of 10° to 25°.
3. The method of claim 1 wherein said aqueous solution of neutralized organic acids contains dispersed oil in an amount within the range of 2 to 10 percent by volume.
4. The method of claim 1 further comprising the step of adding a monovalent salt to said aqueous solution of neutralized organic acids prior to injection thereof.
5. The method of claim 1 further comprising the step of adding an alkaline agent to said aqueous solution of neutralized organic acids prior to the injection thereof.
6. The method of claim 1 wherein at least a portion of the injected aqueous fluid comprises a thickening agent.
7. In a method of recovering oil from a subterranean reservoir penetrated by spaced injection and production systems and located in an oil field, the steps comprising:
   a. mixing water from a source of water in the field in which said reservoir is located with an alkaline agent to form an aqueous alkaline solution,
   b. contacting a petroleum oil produced in said field with said aqueous alkaline solution in an extraction zone to extract neutralized organic acids from said oil,
   c. withdrawing from said extraction zone a first effluent comprising oil and a second effluent comprising a mixture of an aqueous solution of neutralized acids and oil,
   d. passing said second effluent mixture to a separation zone in which at least a portion of the oil in said mixture is separated therefrom,
   e. returning said oil to said first effluent,
   f. withdrawing said aqueous solution of neutralized acids from said separation zone and introducing said solution into said reservoir via said injection system, g. thereafter introducing into said reservoir via said injection system an aqueous flooding medium to displace oil to said production system, and h. recovering oil from said production system.

8. The method of claim 7 wherein the aqueous solution of neutralized acids withdrawn from said separation zone contains dispersed oil in an amount within the range of 2 to 20 percent by volume.

9. The method of claim 7 further comprising the step of heating the second effluent from said extraction zone prior to introducing said mixture into said separation zone.

10. The method of claim 7 wherein water from said field source is circulated in countercurrent flow with said first oil effluent in order to remove alkaline agents entrained in said oil.

* * * * *